United States Patent
Korn et al.

(10) Patent No.: US 7,103,276 B1
(45) Date of Patent: Sep. 5, 2006

(54) OPTICAL BAND SCANNING MONITOR SYSTEM AND METHOD

(75) Inventors: Jeffrey A. Korn, Lexington, MA (US); Walid A. Atia, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 862 days.

(21) Appl. No.: 09/745,157

(22) Filed: Dec. 20, 2000

(51) Int. Cl.
*H04B 10/08* (2006.01)

(52) U.S. Cl. .............................. 398/33; 398/25; 398/26; 398/27; 398/38; 398/79; 398/202; 398/206; 398/208; 398/209; 398/214; 398/91; 398/94; 398/173; 398/177; 398/155; 398/162; 359/341; 359/337; 359/578; 375/224; 375/355; 356/519; 356/517; 356/153; 250/227.18

(58) Field of Classification Search ................ 398/79, 398/25, 26, 27, 33, 38, 91, 94, 173, 177, 398/155, 162, 202, 214, 206, 208, 209; 359/341; 359/337, 578; 375/224, 355; 356/519, 517; 356/153, 394; 250/227.18
See application file for complete search history.

(56) References Cited

U.S. PATENT DOCUMENTS

| | | | |
|---|---|---|---|
| 5,838,488 A * | 11/1998 | Kobayashi | 359/341.41 |
| 5,940,205 A | 8/1999 | Fujita | 359/305 |
| 5,943,147 A * | 8/1999 | Vanoli et al. | 398/27 |
| 6,407,376 B1 * | 6/2002 | Korn et al. | 250/227.23 |
| 6,509,972 B1 * | 1/2003 | Korn | 356/519 |
| 6,532,087 B1 * | 3/2003 | Ransford et al. | 398/27 |
| 6,542,277 B1 * | 4/2003 | Lange et al. | 1/1 |
| 6,559,943 B1 * | 5/2003 | Hall et al. | 356/394 |
| 6,606,354 B1 * | 8/2003 | Bach et al. | 375/224 |
| 6,628,407 B1 * | 9/2003 | Atia et al. | 356/519 |
| 6,674,065 B1 * | 1/2004 | Atia et al. | 250/227.18 |
| 6,687,423 B1 * | 2/2004 | Yao | 385/11 |
| 2002/0030868 A1 * | 3/2002 | Salomma | |

FOREIGN PATENT DOCUMENTS

| | | |
|---|---|---|
| EP | 1 011 213 A2 | 6/2000 |
| EP | 1 022 606 A2 | 7/2000 |
| WO | WO 00/41351 | 7/2000 |

\* cited by examiner

*Primary Examiner*—Hanh Phan
(74) *Attorney, Agent, or Firm*—Houston Eliseeva, LLP

(57) ABSTRACT

A scanning optical monitoring system and method are appropriate for high speed scanning of a WDM signal band. The system and method are able to identify dropped channels or, more generally, discrepancies between the determined or detected channel inventory and a perpetual inventory for the WDM signal, which perpetual inventory specifies the channels that should be present in the WDM signal assuming proper operation of the network. The system includes a tunable optical filter that scans a pass band across a signal band of a WDM signal to generate a filtered signal. A photodetector then generates an electrical signal in response to this filtered signal. A decision circuit compares the electrical signal to a threshold and a controller, which is responsive to the decision circuit, inventories the channels in the WDM signal.

30 Claims, 3 Drawing Sheets

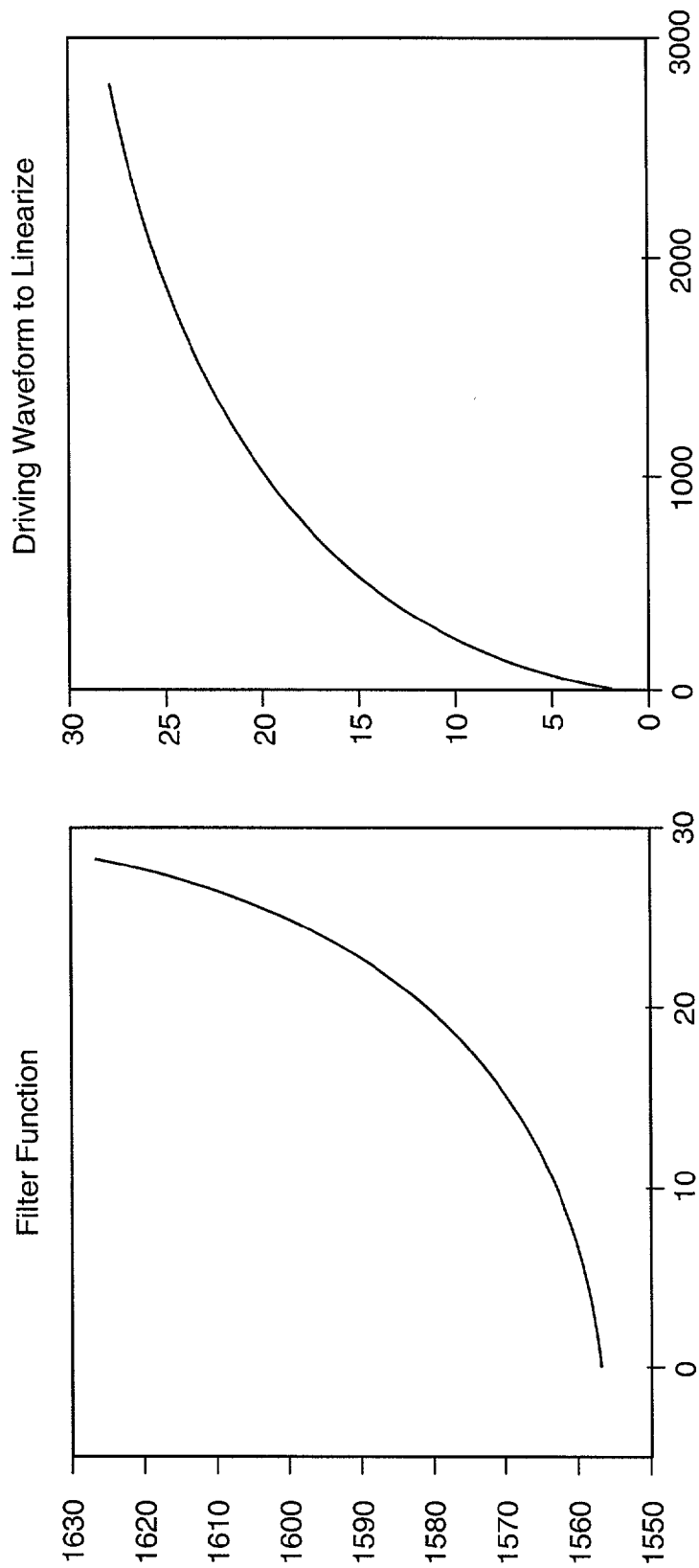

OPTICAL BAND SCANNING MONITOR SYSTEM AND METHOD

BACKGROUND OF THE INVENTION

Wavelength division multiplexing (WDM) systems typically comprise multiple separately modulated laser diodes at the transmitter. These laser diodes are tuned to operate at different wavelengths. When combined in an optical fiber, the WDM optical signal comprises a corresponding number of spectrally separated channels. Along the transmission link, the channels are typically collectively amplified in gain fiber, such as erbium-doped fiber and/or regular fiber, in a Raman pumping scheme. At the receiving end, the channels are usually separated from each other using thin film filter systems, to thereby enable detection by separate photodiodes.

The advantage of WDM systems is that the transmission capacity of a single fiber can be increased. Historically, only a single channel was transmitted in each optical fiber. In contrast, modern WDM systems contemplate hundreds or thousands of spectrally separated channels per fiber. Such configurations yield concomitant increases in the data rate capabilities of each fiber. Moreover, the cost per bit of data for WDM systems is typically less than comparative non-multiplexed systems. This is because any amplification system required along the link can essentially be shared by all of the separate channels transmitted in a single fiber link. With non-multiplexed systems, each channel/fiber would require its own amplification system.

The economics pulling for WDM in the context of long-haul optical links is only one factor suggesting the long-term applicability of the technology. Another application concerns the dynamic routing of individual wavelength slots or channels in optical WDM networks with multiple network access nodes. Such network functionality requires devices that can add and drop specific channels in an optical link.

SUMMARY OF THE INVENTION

Major engineering challenges exist today in the design of add/drop devices that have robust operation. One such challenge concerns the monitoring of the operation of such devices by reference to the channel signals populating the input and output optical links to the devices. At least three factors define the scope of this challenge. First, in dense WDM (DWDM) systems, the channel spacings can be tight, 100 GigaHertz (GHz) to as tight as 50 GHz in some currently proposed systems. Further, the number of potential channels on a link can be large. Observation of the ITU Grid suggests 100's of channels on a link in the $L_\alpha$, $C_\alpha$, and $S_\alpha$ bands, even if the 50 GHz offset of the $L_\beta$, $C_\beta$, and $S_\beta$ band is ignored. Finally, improperly routed or dropped channel signal should be detected quickly. SONET specifications dictate that problems must be detected within 1 millisecond (msec).

The present invention is directed to a scanning optical monitoring system and method. Specifically, a system and method are appropriate for high speed scanning of a WDM signal band. The system and method are able to quickly identify dropped channel signals or, more generally, discrepancies between the determined or detected channel inventory and a perpetual inventory for the WDM signal, which perpetual inventory specifies the channel signals that should be present in the WDM signal assuming proper operation of the network.

In general, according to one aspect, the invention features a scanning optical monitoring system. The system comprises a tunable optical filter that scans a pass band across a signal band of a WDM signal to generate a filtered signal. A photodetector then generates an electrical signal in response to this filtered signal. A decision circuit compares the electrical signal to a threshold, and a controller, which is responsive to the decision circuit, inventories the channels in the WDM signal based on the information from the scan.

In a preferred embodiment, the tunable optical filter tunes across a signal band of the WDM signal in less than one millisecond. Specifically, the tunable optical filter begins and ends a complete scan in less than a millisecond allowing it to then be reset to immediately perform a subsequent scan.

However, in an alternative embodiment, more than one mode of the optical filter is used to scan the entire signal band of the WDM signal. In this case, one of the modes is tuned only across one-half, for example, of the signal band, with another mode handling the other half of the signal band.

In a current implementation, a low pass filter is used to filter the electronic signal from the photodetector prior to reception by the decision circuit. This removes any high frequency interference, allowing the controller to determine the existence, or not, of specific channels during the scan.

The controller determines the channel inventory by comparing an instantaneous power in the pass band of the tunable filter, typically during the scan, to a threshold of the decision circuit to determine whether or not a channel exists at the current pass band or channel slot. An inventory determined from the scan by the controller is then compared to perpetual inventory information that can be accessed by the controller. In this way, the controller can identify whether or not the WDM signal contains the expected channels.

According to the preferred embodiment, the tunable filter is a Fabry-Perot device, having an electrostatic drive cavity in which an electrostatic field is used to displace a flexible membrane. In one implementation, this cavity is sized such that a free spectral range of the tunable filter is greater than a bandwidth of a signal band of the WDM signal. In an alternative embodiment, the free spectral range is less than a bandwidth of the signal band. In this implementation, multiple modes of the tunable filter are used to simultaneously scan the entire signal band.

In one embodiment, a timing recovery circuit is used to control the sampling of the decision circuit by the controller. Such timing recovery circuits function as a software/hardware phase locked loop that locks onto the time series representing the channels in the WDM signal. Therefore, the location, or not, of a channel at a specific point in the scan can be determined.

According to a further embodiment of the invention, a filter tuning voltage generator generates a tuning voltage to the optical tunable filter that improves the linearity of the tuning of the pass band as a function of time over at least a portion of the scan of the signal band. Specifically, in one implementation, the tuning generator is triggered by the controller to in effect generate an arbitrary waveform. The waveform, however, is selected so that the pass band center wavelength changes linearly with time over as least a portion of the scan. Such filter tuning voltage generators map an inverse of a wavelength tuning function of the optical tunable filter. For example, in one implementation, the generator is a look-up table. Alternatively, the filter tuning voltage generators map an inverse of a frequency tuning function of the optical tunable filter. For example, in one implementation, the generator is a look-up table.

In general, according to another aspect, the invention can also be characterized in the context of a method for analyzing a WDM signal. Such method comprises tuning a pass band of a filter across a signal band of the WDM signal to generate a filtered signal. The filtered signal is then detected and a level of the detection signal is compared to a threshold. Finally, an instantaneous pass band of the filter is compared to a level of the detection signal relative to the threshold to analyze a channel inventory in the WDM signal.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2A is a plot of the pass band center wavelength in nanometers as a function of tuning voltage in Volts for the Fabry-Perot tunable filter;

FIG. 2B is a plot of tuning voltage in Volts as a function of time in milliseconds to yield the linearization of the present invention.

DETAILED DESCRIPTION OF THE PREFERRED EMBODIMENTS

Figure 1:
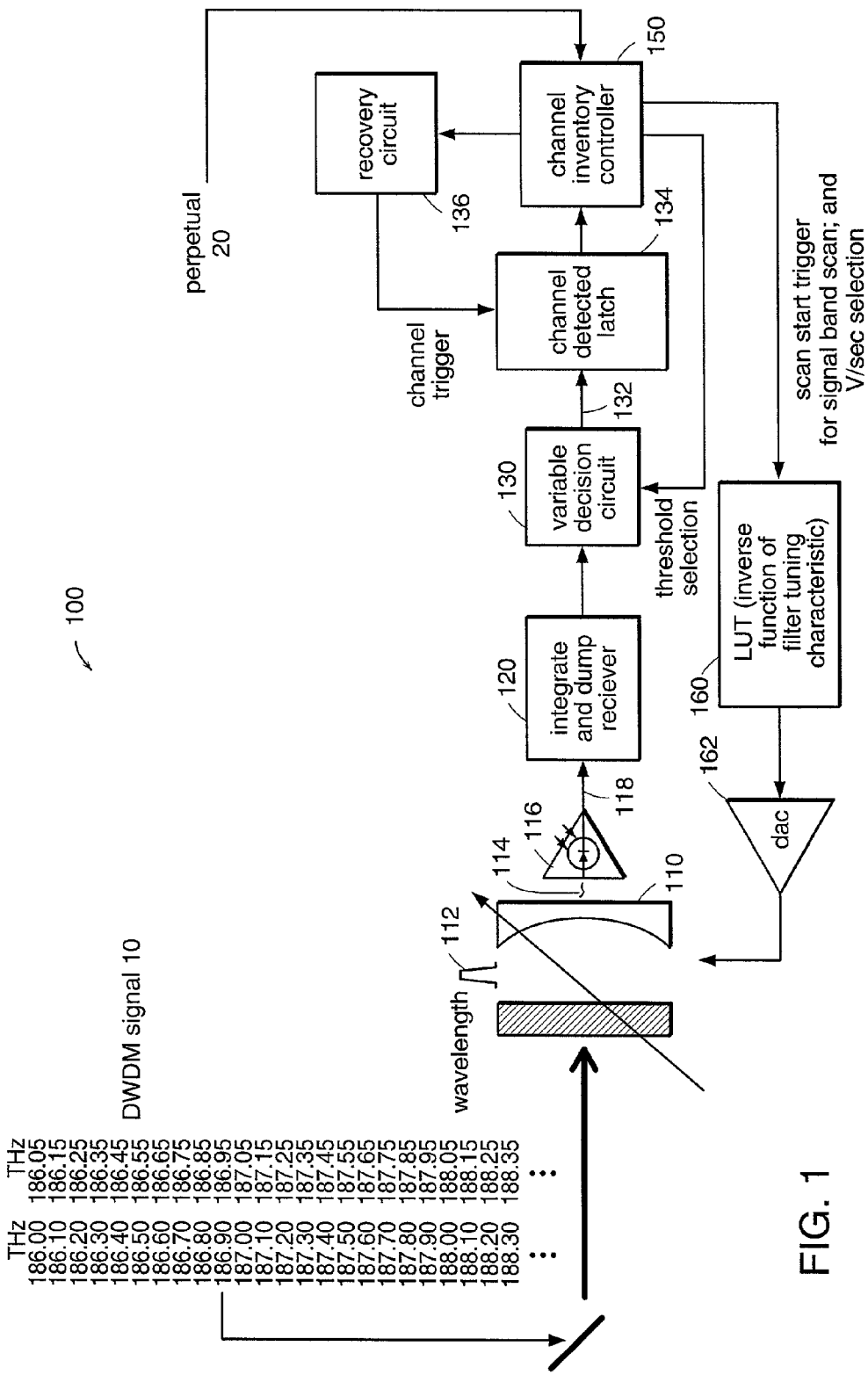
FIG. 1 is a block diagram showing a scanning optical monitoring system of the present invention.

FIG. 1 is a schematic block diagram illustrating an optical band scanning monitoring system 100, which has been constructed according to the principles of the present invention.

Specifically, a WDM signal 10 is received by a tunable optical filter 110. In preferred embodiment, this filter is an electrostatically deflected Fabry-Perot device and is preferably a high finesse device that has a tunable pass band that is narrow to resolve the individual channels in the WDM signal. In one implementation, the WDM signal is a DWDM signal that has multiple channel slots across a signal band of the WDM system. In the illustration of FIG. 1, the WDM signal has 100 GHz channel spacings according to the ITU grid or 50 GHz spacing according to the 50 GHz offset. Specifically, in such an implementation, the pass band of the tunable filter 110 is less than 25 GHz, and preferably less then 5 GHz.

In one embodiment, the free spectral range of the filter 110 is greater than the signal band of the WDM signal. Thus, it is preferably greater than 100 nanometers (nm), preferably about 120 nm. In another embodiment, the free spectral range is set to be about one half of the signal band, with two modes being used to scan the signal band. In this second implementation, a WDM filter is used along with two electronic channels to allow for simultaneous scanning. This general configuration is illustrated in U.S. patent application Ser. No. 09/648,263, filed on Aug. 25, 2000, entitled Optical Channel Monitoring System with Simultaneous C-Band and L-Band Detection, by Flanders, et al., the teachings of which are incorporated herein in their entirety by this reference.

The tunable filter 110 applies the graphically illustrated pass band 112 to yield a filtered optical signal 114. This is detected by photodetector 116. This photodetector or transducer converts the optical signal to an electrical signal 118.

The electrical signal that is generated in response to the filtered optical signal is received by a low pass filter 120. Specifically, this is an integrate-and-dump receiver, which has a time constant that is a function of the scan speed of the pass band and the bandwidth of the scanned channels.

The output from the low pass filter 120 is received by a decision circuit 130. This decision circuit preferably has a variable threshold. In its simplest implementation, this is simply an operational amplifier that is logic high or logic low depending on whether or not the signal from the low pass filter is above or below a threshold voltage that has been set by a digital to analog converter, for example. In the preferred embodiment of the system, the controller sets the level of the threshold. Further, by varying the threshold between scans, the controller can determine the power of the signals in the channel slots.

One advantage of the present invention is that it avoids the need for an analog to digital converter between the photodiode 116 and the controller. While providing for fast sampling, scan-to-scan delay can be large in systems using A/D converters because of the latency associated with dumping the acquired data to the controller. This can be avoided with the present invention. Specifically, in one embodiment, the scans are performed in less than millisecond. The threshold is changed between scans to thereby assess the power of individual channels by reference to other scans.

The decision circuit 130 produces a quasi-digital signal 132. It is a digital signal in the sense that it is either a logic high or logic low state. These state changes, however, may not be synchronized to any system clock of a controller. In one embodiment, signal 132 from the decision circuit 130 is received by a channel detect-latch 134. This latches the logic high or logic low signal 132 from the decision circuit 130 based upon a channel trigger from timing recovery circuit 136. This allows the controller 150 to sample the latched signal.

The controller 150 and recovery circuit 136 function as a phase locked loop that triggers the latch 134 when the pass band of the tunable filter is coincident with a channel slot in the signal band of the WDM signal 10. The timing recovery circuit phase locks on the time series generated by the scanning across the channel slots in the WDM signal 10.

The controller 150 by sampling the state of the channel detect latch as the pass band passes over channels in signal 10 is able to inventory the populated wavelength slots. As a result, it is able to determine which channels in the ITU grid contain actual optical carrier signals by reference to whether or not the power is above or below the applied threshold. This actual accumulated inventory information of the WDM signal 10 is then compared to perpetual inventory information 20 received from a system controller. This perpetual inventory information is the inventory that the controller 150 should have found in the DWDM signal, assuming the proper operation of upstream transmitting devices. In this way, the controller can identify faults when channels are present that should not be present by reference to the perpetual inventory or contrastingly, when channels are not present but are indicated as being present by the perpetual inventory information.

According to another aspect of the invention, the system 100 further comprises a filter tuning voltage generator 160. This generator 160 receives a scanstart trigger and/or voltage per second selection signal from the controller 150. Specifically, it generates through, preferably, a digital-to-analog converter 162 the tuning voltage to the tunable filter 110. Specifically, this tuning voltage is used to generate an electrostatic drive voltage in the tunable filter that causes the deflection of an optical membrane to yield the Fabry-Perot tunable cavity filter functionality.

In a preferred embodiment, the voltage generator 160 generates a tuning voltage to improve a linearization of the tuning of the pass band as a function of time over at least a portion of a scan of the signal band. This functionality is illustrated by reference to FIGS. 2A–2C.

By reference to FIG. 2A, typically, there is a non-linear relationship between the tuning voltage on the horizontal axis and the pass band center frequency of the tunable filter 110. This is due to the electrostatic characteristics of the drive cavity of these tunable filters and the membrane's mechanical characteristics. As a result, incremental changes in the tuning voltage in the early part of the scans, such as around 1550 to 1560 nanometers (nm) yield small shifts in the pass band center. In contrast, near the end of the scan as, for example, between 1620 and 1630 nm, relatively small changes in voltage yield large jumps in the pass band center.

According to one aspect, the tuning voltage generator 160 stores an inverse tuning characteristic as illustrated in FIG. 2B. Specifically, this function has the effect of yielding large changes in voltage as a function of time an early part of the scan and relatively small changes in the voltage as a function of time during the later part of the scan. As a result, when a trigger signal is applied to the tuning voltage generator, the stored function, as illustrated in FIG. 2B is applied to the filter 110.

Figure 2C:
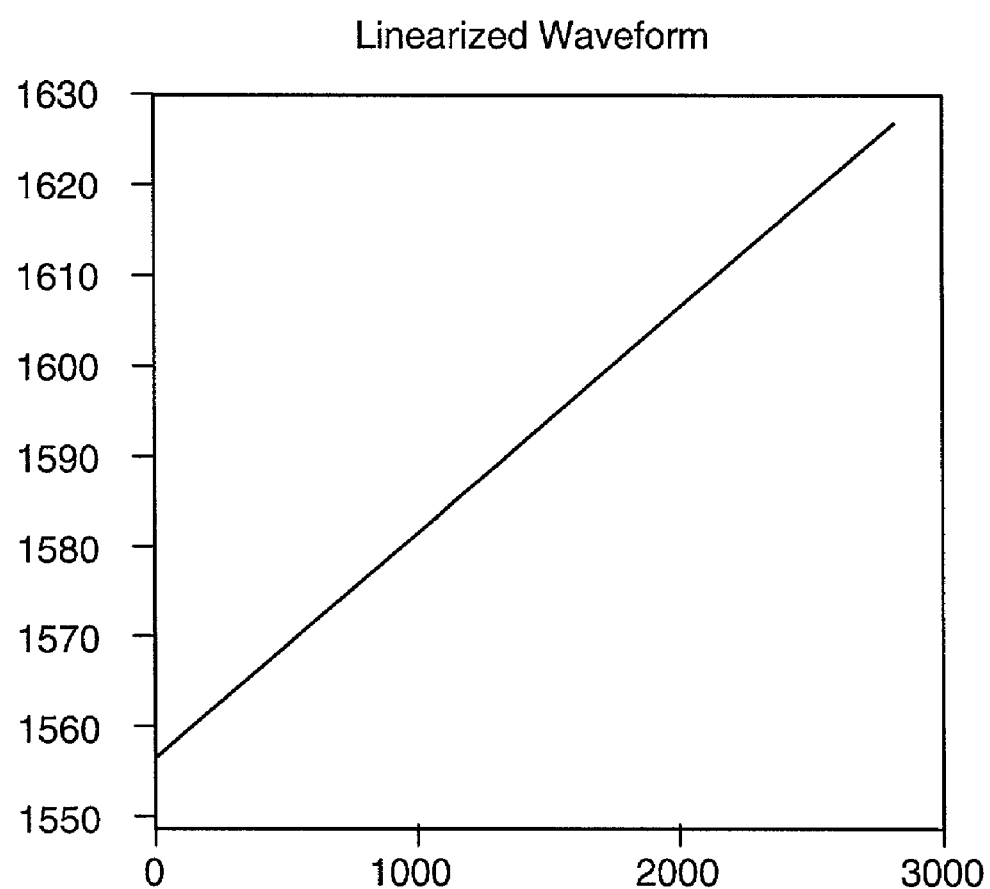
FIG. 2C is a plot of pass band in nanometers as a function of time in milliseconds showing the resultant linearized pass band tuning of the present invention.

As shown by FIG. 2C, when the inverse tuning characteristic is applied to the tunable filter, a linear frequency tuning relationship results, i.e., the tuning of the pass band is linear with time. In one implementation, the tuning is linear with wavelength in time, as illustrated. Alternatively, the tuning is linear with frequency in time. As a result, this allows the time recovery circuit 136 to expect a consistent or near consistent channel-to-channel delay across all or part of the scan allowing it to phase lock onto the power peak series as if it were a clock series to thereby control the latch 134. Further, the controller and recovery circuit are able to identify whether or not a slot is populated by reference to the delay from the generation of the start trigger to the inverse function generator 160.

Generally, whether the filter is linearized in frequency or wavelength depends on the application. Modern WDM systems specify channel spacings in frequency, whereas spectral analysis typically bases analysis in wavelength.

While this invention has been particularly shown and described with references to preferred embodiments thereof, it will be understood by those skilled in the art that various changes in form and details may be made therein without departing from the scope of the invention encompassed by the appended claims.

What is claimed is:

1. A scanning optical monitoring system, comprising:
   a tunable optical filter that scans a pass band across a signal band of an input signal to generate a filtered signal corresponding to a spectrum of the input signal;
   a photo detector that generates an electrical signal in response to the filtered signal;
   a decision circuit that compares the electrical signal to a threshold; and
   a controller that is responsive to the decision circuit to identify spectral features in the input signal by comparing a spectral position of an instantaneous pass band of the tunable filter to a response of the decision circuit to determine the spectral features of the input signal, the instantaneous pass band of the filter being determined by reference to a delay from a generation of a trigger signal starting the scan.

2. A scanning optical monitor system as claimed in claim 1, wherein the tunable optical filter tunes across the signal band in less than 1 millisecond.

3. A scanning optical monitor system as claimed in claim 1, wherein the tunable optical filter begins and ends a complete scan in less than 1 millisecond.

4. A scanning optical monitor system as claimed in claim 1, wherein the tunable optical filter tunes across one half of the signal band in less than 1 millisecond.

5. A scanning optical monitor system as claimed in claim 1, wherein the tunable optical filter is a Fabry-Perot filter.

6. A scanning optical monitor system as claimed in claim 1, further comprising an electronic filter that low pass filters the electronic signal from the photo detector prior to reception by the decision circuit.

7. A scanning optical monitor system as claimed in claim 1, wherein the controller compares the spectral features to expected signal information to assess a validity of the input signal.

8. A scanning optical monitor system as claimed in claim 1, wherein the tunable filter comprises an electrostatic drive cavity in which an electrostatic field is generated to displace a flexible membrane of the tunable filter.

9. A scanning optical monitor system as claimed in claim 1, wherein a free spectral range of the tunable filter is greater than a bandwidth of the signal band of the input signal.

10. A scanning optical monitor system as claimed in claim 1, wherein a free spectral range of the tunable filter is less than a bandwidth of the signal band.

11. A scanning optical monitor system as claimed in claim 1, wherein a free spectral range of the tunable filter is less than a bandwidth of the signal band but greater than one-half of the bandwidth of the signal band.

12. A scanning optical monitor system as claimed in claim 11, further comprising:
   an input filter for separating the filtered signal into a first sub-band and a second sub-band; and
   a first sub-band detector and a second sub-band detector.

13. A scanning optical monitor system as claimed in claim 1, further comprising a timing recovery circuit that controls sampling of the decision circuit by the controller.

14. A scanning optical monitor system as claimed in claim 1, wherein the controller generates a threshold set signal the specifies a level of the threshold applied by the decision circuit.

15. A scanning optical monitor system as claimed in claim 1, further comprising a filter tuning voltage generator that generates a tuning voltage to the optical tunable filter.

16. A scanning optical monitor system as claimed in claim 1, further comprising a filter tuning voltage generator that generates a tuning voltage to the optical tunable filter that improves a linearization of the tuning of the passband as a function of time over at least a portion of the scan of the signal band.

17. A scanning optical monitor system as claimed in claim 1, further comprising a filter tuning voltage generator that generates a tuning voltage to the optical tunable filter that linearizes the tuning of the passband as a function of time over at least a portion of the scan of the signal band.

18. A scanning optical monitor system as claimed in claim 17, wherein the filter tuning voltage generator maps an inverse of a tuning function of the optical tunable filter.

19. A scanning optical monitor system as claimed in claim 17, wherein the filter tuning voltage generator comprises a look-up table.

20. A scanning optical monitor system as claimed in claim 1, wherein the input signal is a wavelength division multiplexed signal and the spectral features are an inventory of WDM channels.

21. A scanning optical monitoring system, comprising:
a tunable optical filter that scans a pass band across a signal band of an input signal to generate a filtered signal corresponding to a spectrum of the input signal;
a photo detector that generates an electrical signal in response to the filtered signal;
a variable decision circuit that compares the electrical signal to a variable threshold; and
a controller that sets a level of the variable threshold and is responsive to the decision circuit to analyze power in the input signal based on the level of the variable threshold by comparing a spectral position of an instantaneous pass band of the tunable filter to a response of the decision circuit to determine spectral features of the input signal, the instantaneous pass band of the filter being determined by reference to a delay from a generation of a trigger signal starting the scan.

22. A method for analyzing an input signal comprising:
tuning a pass band of a filter across a signal band of the input signal to generate a filtered signal corresponding to the spectrum of the input signal;
detecting the filtered signal;
comparing a level of the detection signal to a threshold;
comparing an instantaneous pass band spectral position of the filter to a level of the detection signal relative to the threshold to analyze spectral features in the input signal; and
determining the instantaneous pass band of the filter by reference to a delay from a generation of a trigger signal starting the scan.

23. A method as claimed in claim 22, further comprising tuning the filter across the signal band in less than 1 millisecond.

24. A method as claimed in claim 22, further comprising tuning the filter across one half of the signal band in less than 1 millisecond.

25. A method as claimed in claim 22, further comprising low pass filtering a detection signal prior to the step of comparing the detection signal to the threshold.

26. A method as claimed in claim 22, further comprising comparing the spectral feature to perpetual inventory information.

27. A method as claimed in claim 22, further comprising tuning multiple modes of the filter across the signal band simultaneously.

28. A method as claimed in claim 22, further comprising changing the threshold between scans to determined channel powers in the input signal.

29. A method as claimed in claim 22, further comprising driving the filter with a tuning function that is non-linear with response to time across the scan and improving a linearization of the tuning of the passband as a function of time over at least a portion of the scan of the signal band.

30. A method for analyzing a WDM signal comprising:
tuning a pass band of a filter across a signal band of the WDM signal to generate a filtered signal in a first scan of the WDM signal;
detecting the filtered signal;
comparing a level of a detection signal to a first threshold;
comparing an instantaneous pass band of the filter to a level of the detection signal relative to the first threshold;
tuning the passband of the filter across the signal band in a second scan of the WDM signal;
comparing the level of the detection signal to a second threshold;
comparing an instantaneous pass band of the filter to a level of the detection signal relative to the second threshold;
comparing the first scan and the second scan to determined channel power; and
determining the instantaneous pass band of the filter by reference to a delay from a generation of a trigger signal starting the scan.

* * * * *